(12) United States Patent
Neese et al.

(10) Patent No.: US 12,304,785 B2
(45) Date of Patent: May 20, 2025

(54) SUPPORT ROLLER BEARING REGREASING ARRANGEMENT FOR HIGH LOAD CRANK ASSEMBLY

(71) Applicant: Nidec Motor Corporation, St. Louis, MO (US)

(72) Inventors: Thomas A. Neese, Columbus, IN (US); Barry M. Newberg, Florissant, MO (US); Raymond D. Heilman, Florissant, MO (US); William R. Lewis, St. Peters, MO (US)

(73) Assignee: Nidec Motor Corporation, St. Louis, MO (US)

( * ) Notice: Subject to any disclaimer, the term of this patent is extended or adjusted under 35 U.S.C. 154(b) by 330 days.

(21) Appl. No.: 17/874,365

(22) Filed: Jul. 27, 2022

(65) Prior Publication Data
US 2023/0031345 A1    Feb. 2, 2023

Related U.S. Application Data

(60) Provisional application No. 63/226,804, filed on Jul. 29, 2021.

(51) Int. Cl.
*F16C 3/22* (2006.01)
*B66F 3/00* (2006.01)
*B66F 3/44* (2006.01)

(52) U.S. Cl.
CPC .............. *B66F 3/005* (2013.01); *B66F 3/44* (2013.01); *F16C 3/22* (2013.01)

(58) Field of Classification Search
CPC ........ F16C 13/00; F16C 13/02; F16C 13/006; F16C 13/022; F16C 3/00; F16C 3/005; F16C 3/22; F16C 9/00; F16C 9/06; F16C 9/063; B66F 3/00; B66F 3/005; B66F 3/44
See application file for complete search history.

(56) References Cited

U.S. PATENT DOCUMENTS 3,642,391 A * 2/1972 Wilson .................... F02B 53/00
                                                    418/253
4,357,504 A * 11/1982 Cleaveland ............ H01H 31/30
                                                    200/48 R

FOREIGN PATENT DOCUMENTS

JP           02067470 A  *  3/1990

* cited by examiner

*Primary Examiner* — Tran N Nguyen
(74) *Attorney, Agent, or Firm* — Hovey Williams LLP

(57) ABSTRACT

A crank assembly for displacing a load includes a motor and a displacement arm assembly. The motor includes a rotatable output shaft that defines a rotation axis. The displacement arm assembly includes a swingable crank arm and a support roller bearing. The swingable crank arm is coupled to the output shaft to swing about the rotation axis when the output shaft rotates. The swingable crank arm defines a pivot end adjacent the rotation axis and an opposite displacement end. The support roller bearing is rotatably supported on the swingable crank arm proximate the displacement end. The support roller bearing is configured to engage the load. The support roller bearing defines a bearing axis, which is substantially parallel to and offset from the rotation axis.

15 Claims, 8 Drawing Sheets

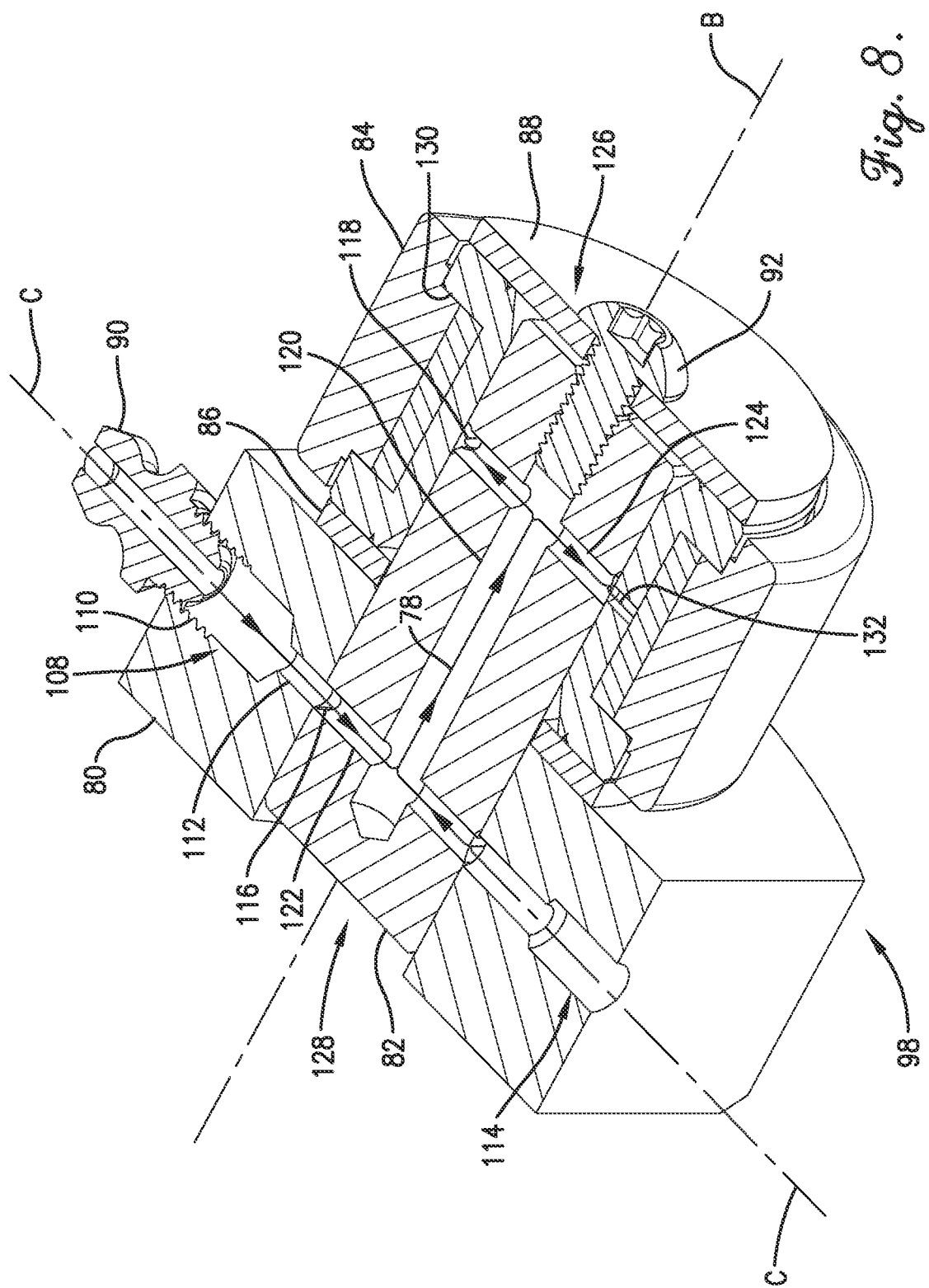

SUPPORT ROLLER BEARING REGREASING ARRANGEMENT FOR HIGH LOAD CRANK ASSEMBLY

CROSS-REFERENCE TO RELATED APPLICATIONS

This application claims the priority benefit of identically titled U.S. Provisional Patent Application Ser. No. 63/226,804, filed Jul. 29, 2021, the entirety of which is incorporated herein by reference.

FIELD OF THE DISCLOSURE

The embodiments described herein relate generally to an electric motor for displacing a load. More particularly, embodiments of the present invention concern a compact, high load crank assembly utilizing an electric motor.

BACKGROUND

At least some known displacement devices require shifting high loads, with space restrictions for the components used to displace the loads. For example, some automated guided vehicles (AGVs) are compact and have limited space available for electronics, electric motors, displacement devices, and rotatable platforms.

Some displacement applications use a screw jack type system to displace a load. Such systems, however, are typically large and heavy. Thus, in applications that require small or compact displacement devices, screw jack type systems do not allow a user to fit all of the necessary hardware and electric components into the reduced, available space. In addition, the use of screw jack type systems is costly. Furthermore, applications that employ screw jack type systems consume electrical power at an increased rate, due in part, to the weight of the hardware required for a screw jack type system.

Other displacement applications employ a traditional cam-follower system. A cam is typically coupled to a rotational central axis (such as, an electric motor rotor shaft). The cam has a defined profile that enables the motor to shift the load. The cam interfaces with a follower fixed to a displacement platform. Cam-follower systems, however, typically occupy a relatively large space and have a reduced displacement distance. This is often due to the fact that in a traditional cam-follower system, the follower cannot cross the rotation axis of the cam.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a crank assembly for displacing a load is provided. The crank assembly includes a motor and a displacement arm assembly. The motor includes a rotatable output shaft defining a rotation axis. The displacement arm assembly includes a swingable crank arm coupled to the output shaft to swing about the rotation axis when the output shaft rotates. The swingable crank arm defines a pivot end adjacent the rotation axis and an opposite displacement end. The displacement arm assembly also includes a support roller bearing rotatably supported on the swingable crank arm proximate the displacement end. The support roller bearing is configured to engage the load. The support roller bearing defines a bearing axis. The bearing axis is substantially parallel to and offset from the rotation axis.

In another aspect, an apparatus is provided. The apparatus includes a chassis and a vertical displacement assembly for displacing a load. The vertical displacement assembly is coupled to the chassis. The apparatus also includes a support platform coupled to the vertical displacement assembly. The load is positioned on the support platform. In addition, the apparatus includes a crank assembly coupled to the chassis. The crank assembly engages the vertical displacement assembly. The crank assembly is operable to vertically displace the support platform via the vertical displacement assembly. The crank assembly includes a motor having a rotatable output shaft that defines a rotation axis. The crank assembly also includes a displacement arm assembly. The displacement arm assembly includes a swingable crank arm coupled to the output shaft. The swingable crank arm swings about the rotation axis when the output shaft rotates. The swingable crank arm defines a pivot end adjacent the rotation axis and an opposite displacement end. The displacement arm assembly also includes a support pin coupled to swingable crank arm at the displacement end. The support pin defines a first end and an opposite second end. Furthermore, the displacement arm assembly includes a support roller bearing rotatably supported on the support pin at the first end. The support roller bearing is configured to engage the vertical displacement assembly. The support roller bearing defines a bearing axis. The bearing axis is substantially parallel to and offset from the rotation axis.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 8 is a top sectioned front perspective view of the displacement arm assembly shown in FIG. 5.

Figure 1:
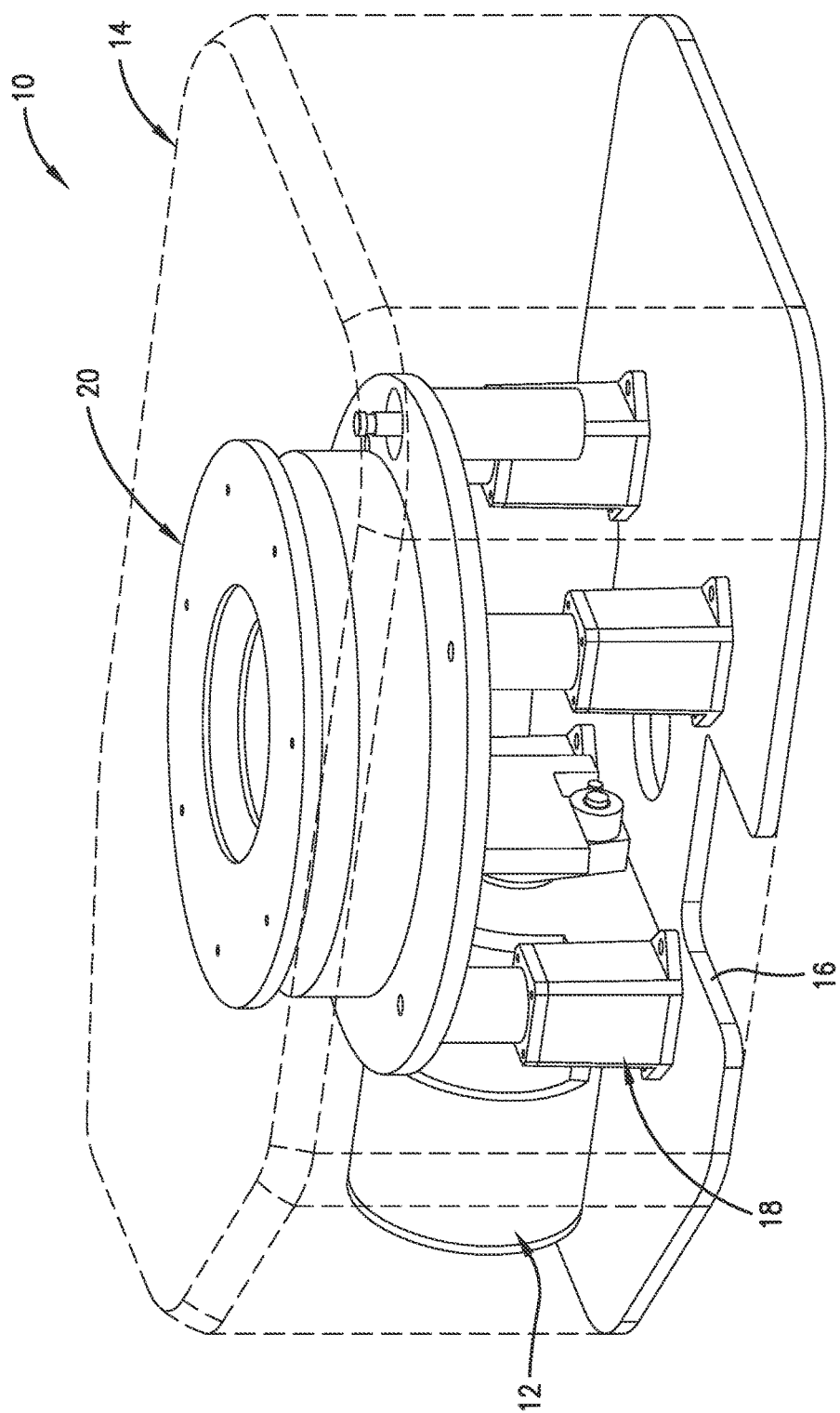
FIG. 1 is a perspective view of an autonomous guided vehicle (AGV) including a displacement crank assembly, in accordance with one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made, without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, and the like described in one embodiment may also be included in other embodiments but is not necessarily included. Thus, the present technology can include a variety of combinations and/or integrations of the embodiments described herein.

In the following specification and claim, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claim, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, and the like, relative to the chosen frame of reference.

Broadly, this disclosure is directed to a compact crank assembly most preferably configured for operation in space-restricted applications in which a high load must be displaced. The crank assembly generally incorporates an electric motor and a crank or displacement arm. The preferred crank or displacement arm includes a support roller bearing (or support roller) rotatably coupled to an axial pin proximate a distal end of the crank arm. The axial pin includes a unique lubrication path that cooperates with a lubrication path defined in the crank arm to supply lubrication to the support roller.

An advantage of this compact crank assembly is that it enables an increased displacement distance as compared to conventional designs. In particular, the support roller bearing coupled to the crank arm allows a displacement structure or element to be displaced from a first position located on a first side of the rotation axis (such as, below the rotation centerline of the electric motor) to a second position located on an opposite second side of the rotation axis (such as, above the rotation centerline of the electric motor). In conventional designs, the structure being displaced has a support roller bearing coupled thereto and the electric motor has a cam coupled to the rotor shaft. The cam engages the support roller bearing to displace the structure. In such an arrangement, the structure cannot cross the rotation axis of the electric motor. The compact crank assembly disclosed in the present application has a reduced size enabling use in smaller space-restricted applications. Enabling an engagement portion of the displaced structure to cross the rotation axis of the electric motor facilitates increasing a displacement distance. An added benefit is reduced cost, weight, and energy consumption of the disclosed compact electric motor as compared to conventional designs.

Exemplary Displacement System

FIG. 1 is a perspective view of an autonomous guided vehicle (AGV) 10 including a crank assembly 12, in accordance with one aspect of the present invention. The AGV 10 includes a main body 14 supported on a chassis 16, a vertical displacement assembly 18 coupled to the chassis 16, and a rotatable support platform 20 coupled to the vertical displacement assembly 18. The AGV may include, for example, a pair of drive wheels (not shown) that enable the AGV 10 to have a zero-turn radius. Furthermore, in one embodiment, the AGV 10 may preferably be battery-powered and rechargeable.

The AGV 10 is preferably configured to transport items in a warehouse environment. For example, and without limitation, in one embodiment, the AGV 10 may be configured to (1) vertically displace one or more items on the rotatable support platform 20 via the vertical displacement assembly 18; (2) rotate at least a portion of the rotatable support platform 20 to orient the items to a selected orientation; (3) transport the items on the rotatable support platform 20 from a first location to a second location (such as, in the warehouse); (4) vertically displace the items on the rotatable support platform 20 via the vertical displacement assembly 18 to leave the items at the second location; and (5) completely disengage from the items via lowering of the vertical displacement assembly 18 so as to no longer be in contact with the items.

The AGV 10 may be provided with numerous features to enable such operation, including but not limited to one or more printed circuit boards, sensors, cameras, and communication devices (not shown). In addition, a control system (not shown) may also be provided to control each AGV 10 and to synchronize operation of multiple AGVs 10 in a warehouse.

In the exemplary embodiment, the crank assembly 12 is operable to vertically displace (such as, raise and lower) the rotatable support platform 20 via the vertical displacement assembly 18. Although the crank assembly 12 is described herein as a component of the AGV 10, it is within the scope of the present invention for the crank assembly 12 to instead be provided in an alternative application. For example, the crank assembly 12 might be used to raise and lower a load that is in no manner associated with a robot or a warehouse operation.

Exemplary Displacement Motor

Figure 2:
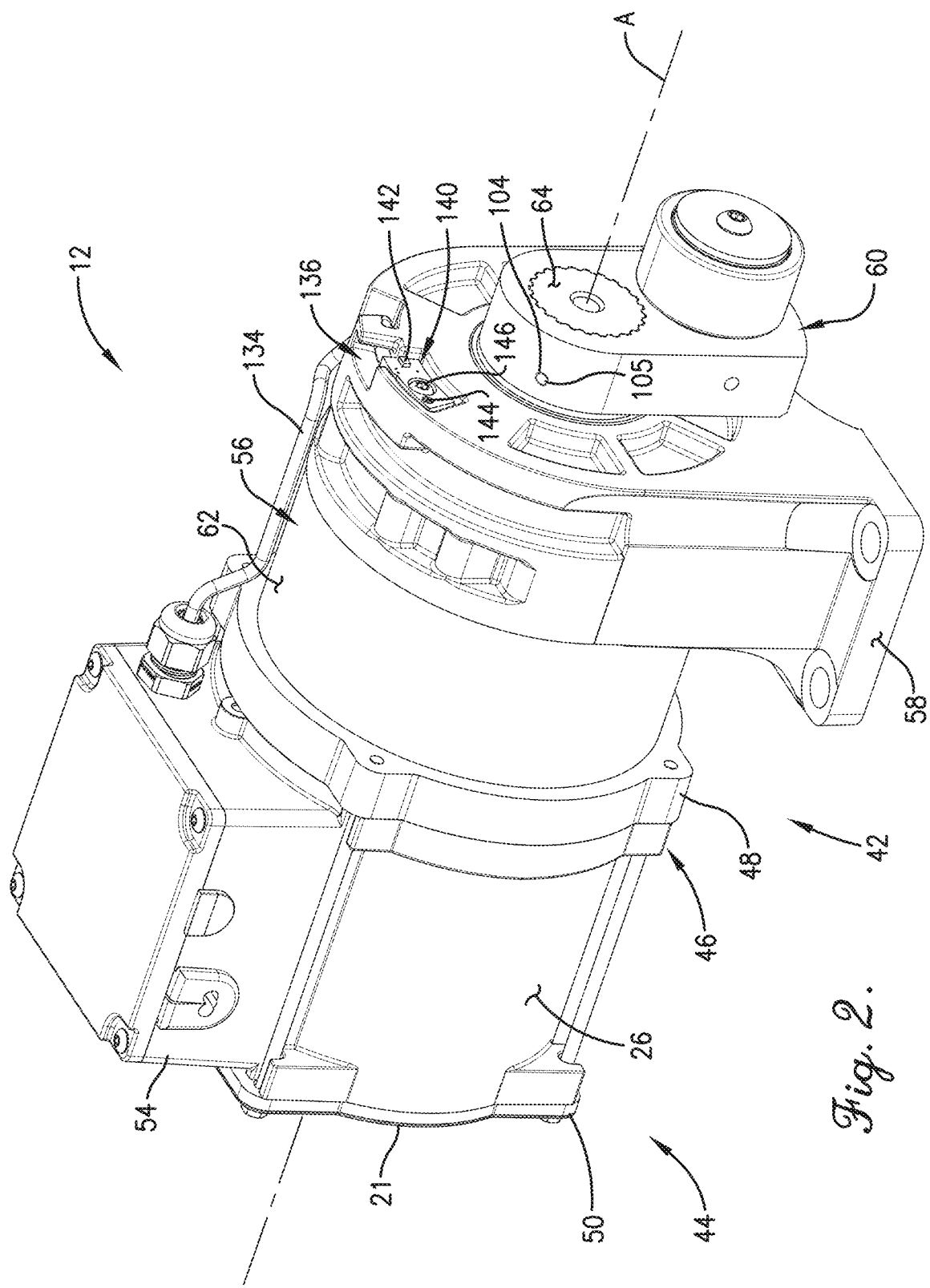
FIG. 2 is a front perspective view of the exemplary crank assembly shown in FIG. 1.
Figure 3:
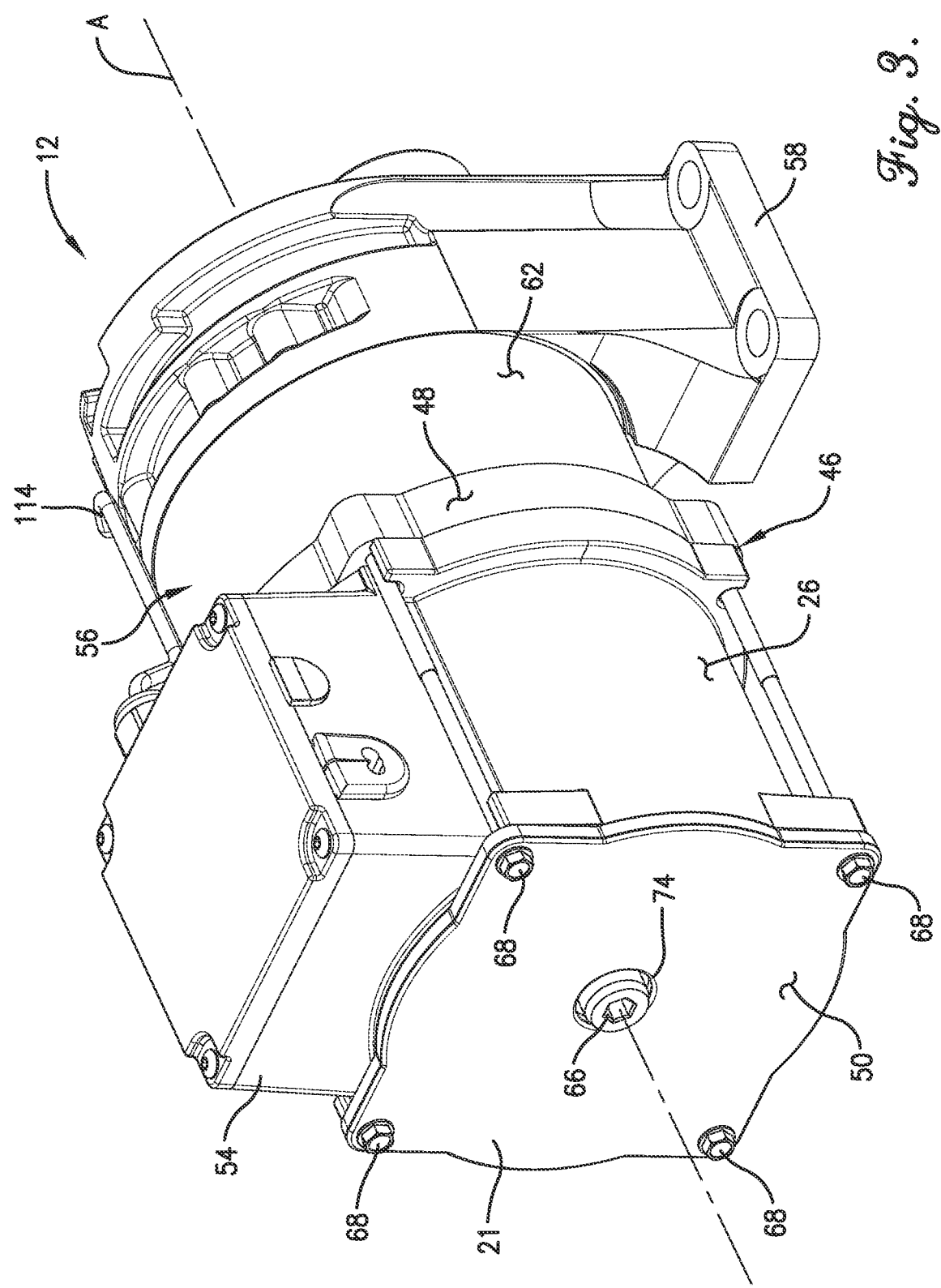
FIG. 3 is a rear perspective view of the exemplary crank assembly shown in FIG. 1.
Figure 4:
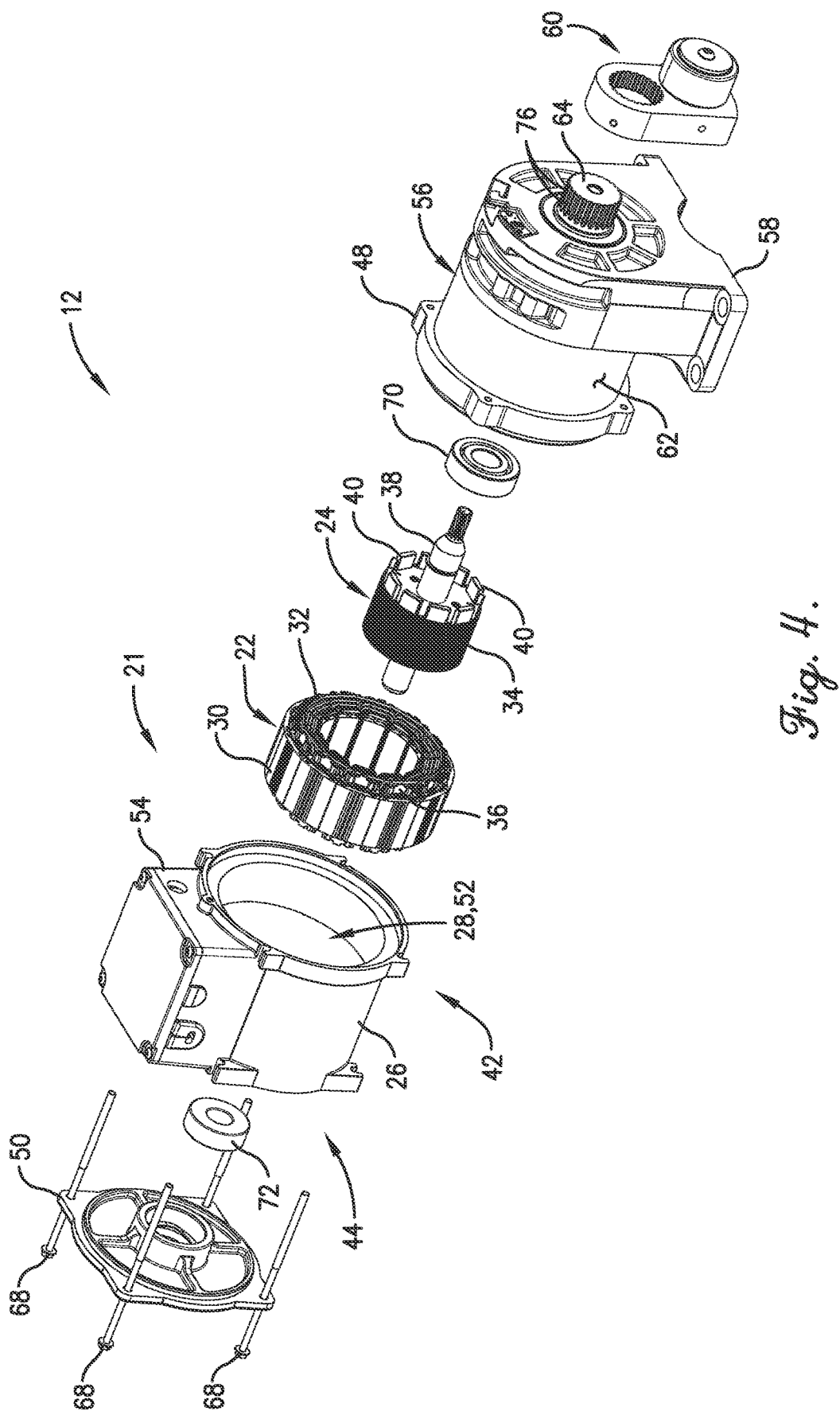
FIG. 4 is an exploded front perspective view of at least a portion of the crank assembly shown in FIG. 1.

FIG. 2 is a front perspective view of the exemplary crank assembly 12, in accordance with one aspect of the present invention. FIG. 3 is a rear perspective view of the exemplary crank assembly 12. FIG. 4 is an exploded front perspective view of at least a portion of the crank assembly 12. In the exemplary embodiment, the crank assembly 12 is depicted as including a motor 21, and more particularly, an inner rotor motor. As will be described, the motor 21 has magnets positioned radially inward relative to windings, which function as a stator. However, according to some aspects of the present invention, the motor 21 may alternately be an outer rotor motor or dual rotor motor.

As shown in FIG. 4, the illustrated motor 21 broadly includes a stator assembly 22 and a rotor assembly 24 substantially enclosed within an outer shell 26. The rotor assembly 24 is supported for rotation relative to the stator assembly 22 about a rotation axis "A." The outer shell 26 is generally cylindrical in shape and defines a cavity 28 for receiving at least a portion of the stator assembly 22 and the rotor assembly 24.

The stator assembly 22 is generally toroidal in form and defines a stator axis that is coaxial with the rotation axis "A." However, according to some aspects of the present invention, it is permissible for the axes to be non-coaxial. The stator assembly 22 preferably includes a stator core 30 and a plurality of coils 32 wound about the stator core 30. Furthermore, in some embodiments, the stator assembly 22 includes a plurality of electrically insulative coverings 36 positioned between the stator core 30 and the coils 32.

The stator core 30 preferably is fabricated from steel and may be of either solid or laminated construction. Alternatively, or additionally, the stator core 30 may be segmented in form. However, according to certain aspects of the present invention, the stator core 30 may be fabricated from any one or more of a variety of suitable materials and/or construction methods.

The stator core 30 preferably includes an annular yoke (not shown) and a plurality of arcuately spaced apart teeth (not shown) extending at least generally radially inward from the yoke. It is contemplated that the stator core 30 can have any number of teeth that enables the motor 21 to function as described herein. The plurality of coils 32 are formed by electrically conductive wiring wound being about each of the teeth. The wiring encircles each tooth to form the coils 32, with each of the coils 32 corresponding to one of the teeth. The wiring is preferably copper, although aluminum or any one or more of a variety of electrically conductive materials may be used without departing from the scope of the present invention.

In the exemplary embodiment, the rotor assembly 24 is depicted as a brushless permanent magnet rotor assembly and includes a rotor core 34 and a rotor shaft 38. The rotor shaft 38 defines a rotation axis for the rotor assembly 24. The rotor assembly 24 also includes a plurality of magnets 40. The rotation axis of the rotor assembly 24 is coaxial with the rotation axis "A."

The rotor core 34 is generally cylindrical in form and preferably is fabricated from steel. The rotor core 34 may be of either solid or laminated construction. Alternatively, or additionally, the rotor core 34 may be segmented in form. However, according to certain aspects of the present invention, the rotor core 34 may be fabricated from any one or more of a variety of suitable materials and/or construction methods.

As described above, the motor 21 includes the outer shell 26. The outer shell 26 is generally cylindrical in shape and extends generally circumferentially about the stator assembly 22. Alternatively, according to certain aspects of the present invention, the outer shell 26 may extend about the stator assembly 22 in such a way as to provide one or more flat sides or to be otherwise alternatively shaped. In the exemplary embodiment, the outer shell 26 presents axially opposite first and second shell ends 42 and 44, respectively, and extends substantially continuously about the stator assembly 22 and rotor assembly 24 to enclose, at least in part, the stator assembly 22 and the rotor assembly 24. According to certain aspects of the present invention, the outer shell 26 includes openings or slots therethrough. For example, in certain embodiments, one or more openings or slots may be provided to facilitate ventilation and/or access.

The outer shell 26 forms a portion of a motor case 46 of the motor 21. The motor case 46 includes the outer shell 26 and first and second endshields 48 and 50, respectively. The outer shell 26 and the first and second endshields 48 and 50 cooperatively define a motor chamber 52 that at least substantially receives the stator assembly 22 and the rotor assembly 24. More particularly, the first endshield 48 is positioned adjacent the first shell end 42 and coupled thereto. In addition, the second endshield 50 is positioned adjacent the second shell end 44 and coupled thereto. Specifically, the outer shell 26 is coupled to and held in place between the first and second endshields 48 and 50 by a plurality of fasteners 68 extending between and coupled to the endshields 48 and 50. It is contemplated that, in certain aspects of the present invention, one or both of the first and second endshields 48 and 50 may be located inwardly or spaced outward from the respective shell ends 42 and 44.

As depicted in FIG. 3, the second endshield 50 includes an aperture 74 defined therethrough. The aperture 74 facilitates easy access to an end of the rotor shaft 38. In the exemplary embodiment, the end of the rotor shaft 38 includes a hexagonal interface 66 to enable a user to manually rotate the rotor shaft 38. In other embodiments, however, it is contemplated that the second endshield is free of the aperture 74 such that the end of the rotor shaft 38 is enclosed within the motor case 46.

The motor 21 further preferably includes an electrical connection box 54 for receiving power or control wiring (not shown), sensor wiring, such as wiring 134, and other electronic components (not shown) for operation of the motor 21. In the depicted embodiment, the electrical connection box 54 is, in part, integrally formed with the outer shell 26. It is contemplated, however, that in some aspects of the present invention, a non-integral configuration (such as, one that relies on fasteners, welds, adhesives, and/or other interconnection means to fix the electrical connection box relative to the outer shell) may be provided.

In the exemplary embodiment, the crank assembly 12 also includes a gearbox assembly 56 including a motor mount bracket 58, and a displacement arm assembly 60. In a preferred embodiment, the crank assembly 12 includes a crank arm position sensor assembly 136 that senses an angular or rotational position of the displacement arm assembly 60. The crank arm position sensor assembly 136 is coupled to the sensor wiring 134, discussed above.

The crank arm position sensor assembly 136 is fixed relative to the motor mount bracket 58 and includes a printed circuit board 140 and the associated sensor wiring 134. The crank arm position sensor assembly 136 also includes a sensor 142 coupled to the printed circuit board 140. The printed circuit board 140 is positioned in a predetermined, precise location on the motor mount bracket 58 by means of a board locating pin 144 and a fastener 146.

As depicted in the example embodiment, the motor 21 is oriented such that the rotation axis "A" extends generally horizontally. The motor mount bracket 58 generally serves as a base structure to secure the motor 21 to another structure, such as the chassis 16.

The gearbox assembly 56 includes a gear train (not shown) at least substantially enclosed within a gearbox housing 62. An output shaft 64 of the gear train extends outward from the gearbox housing 62. The output shaft 64 is concentric with the rotation axis "A." In some embodiments however, it is contemplated that the output shaft 64 may be located other than concentric with the rotation axis "A" of the motor 21. For example, the output shaft 64 may be offset from but substantially parallel to the rotation axis "A." In other embodiments, the output shaft 64 may be angled relative to the rotation axis "A."

In the exemplary embodiment, the gearbox housing 62 is coupled to the first endshield 48, for example, via one or more fasteners (not shown). It is contemplated that other securement means (such as, latches, welding, adhesives, partial or complete integral construction, and the like) may additionally or alternatively be used to secure the gearbox housing 62 to the first endshield 48. Furthermore, the gearbox housing 62 is coupled to the motor mount bracket 58 opposite the first endshield 48. In one embodiment, the gearbox housing 62 may be integrally formed with one or more of the motor mount bracket 58 and the first endshield 48. For example, the motor mount bracket 58 and the gearbox housing 62 and/or the first endshield 48 may be formed of a single cast structure.

The motor 21 includes first and second bearing assemblies 70 and 72 that cooperatively rotatably support the rotor shaft 38 of the rotor assembly 24. The first endshield 48 is configured to support the first bearing assembly 70 and the second endshield 50 is configured to support the second bearing assembly 72. Alternative or additional bearing assembly supports may be provided without departing from the scope of the present invention.

Displacement Arm Assembly

Figure 5:
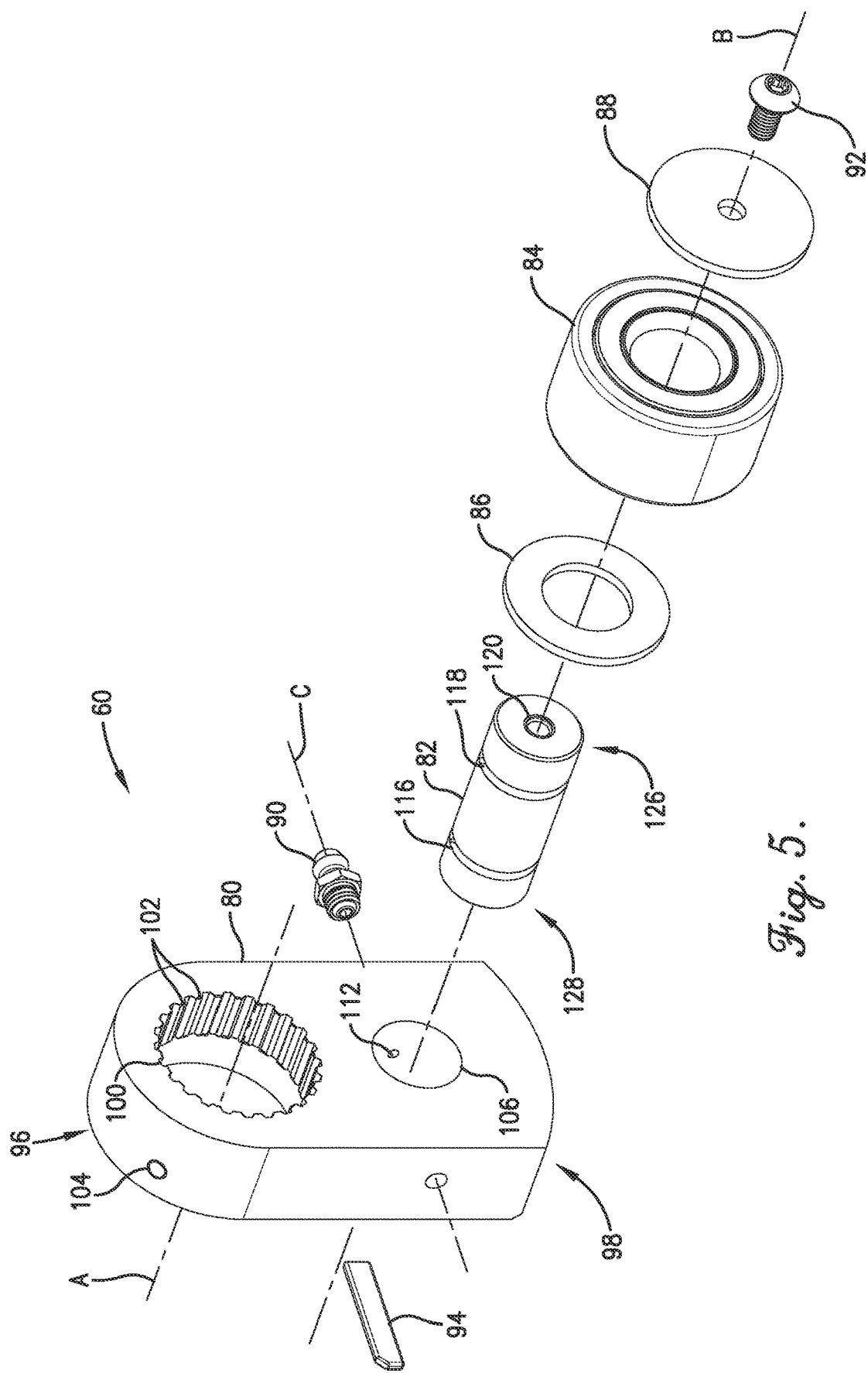
FIG. 5 is an exploded front perspective view of a displacement arm assembly of the crank assembly shown in FIG. 1.
Figure 6:
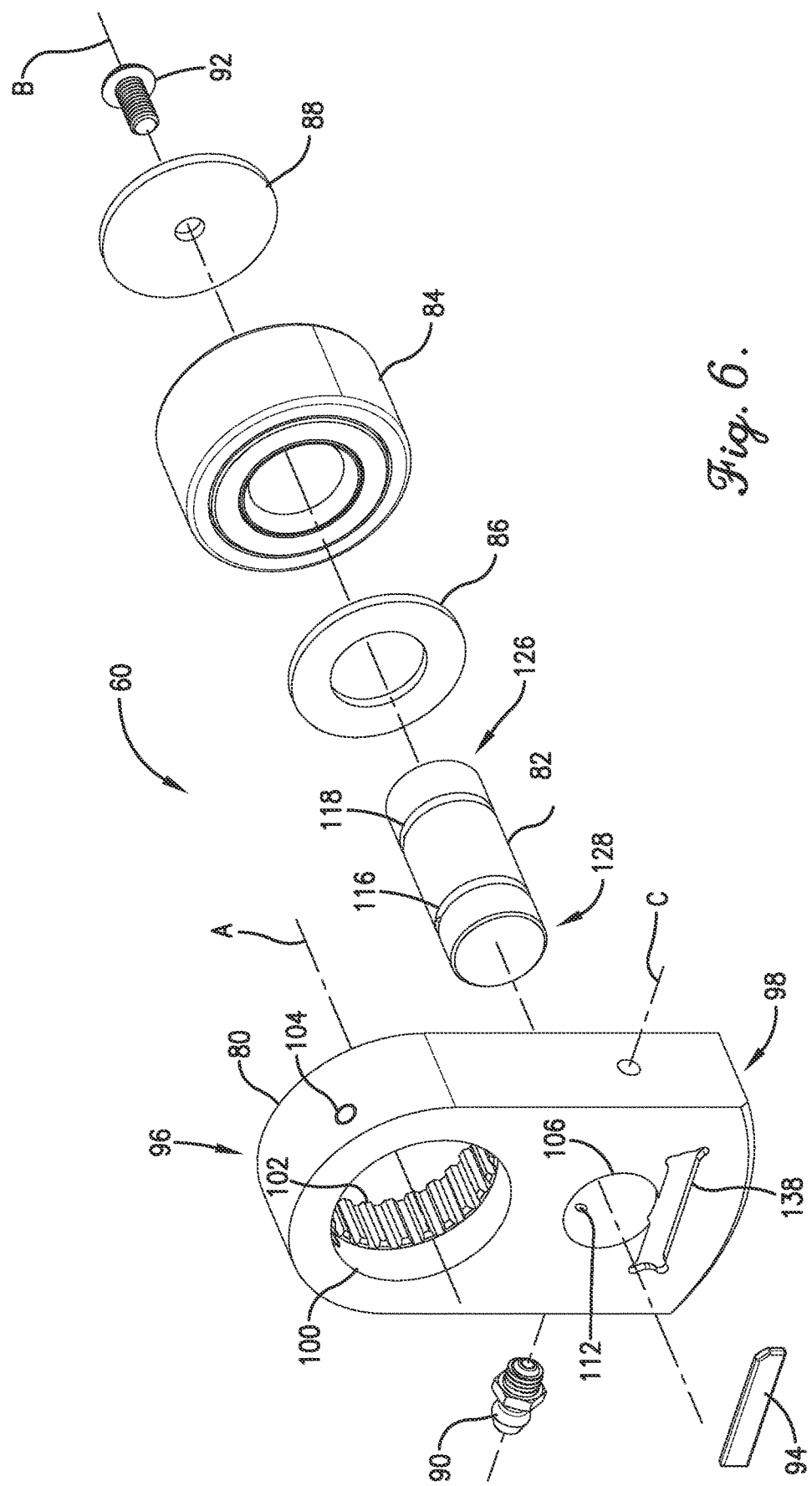
FIG. 6 is an exploded rear perspective view of the displacement arm assembly shown in FIG. 5.
Figure 7:
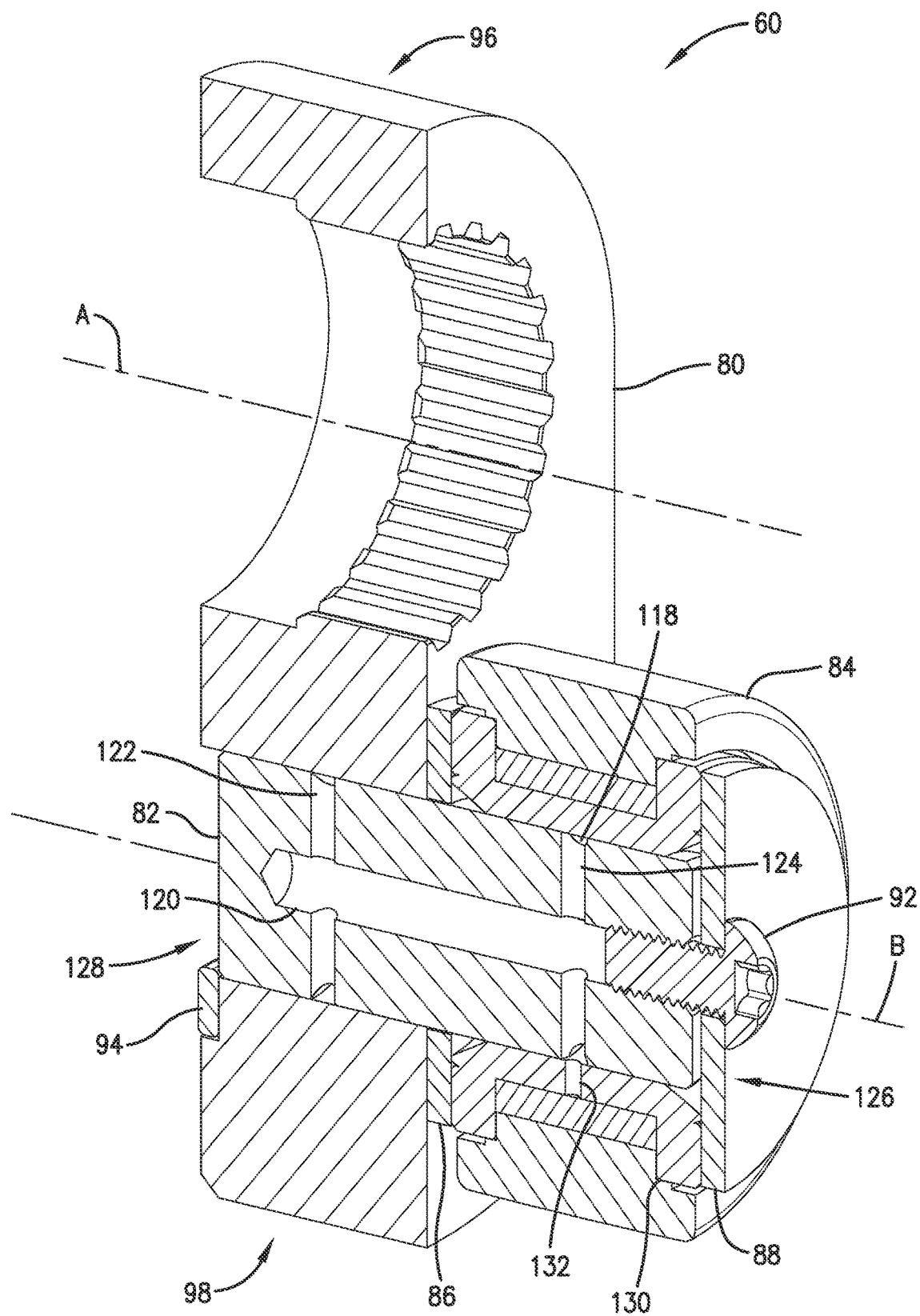
FIG. 7 is a side sectioned front perspective view of the displacement arm assembly shown in FIG. 5.

FIG. 5 is an exploded front perspective view of the displacement arm assembly 60, in accordance with one aspect of the present invention. FIG. 6 is an exploded rear perspective view of the displacement arm assembly 60. FIG. 7 is a side sectioned front perspective view of the displacement arm assembly 60. FIG. 8 is a top sectioned front perspective view of the displacement arm assembly 60. In the example embodiment, the displacement arm assembly 60 is positioned on an axial end of the motor 21. More particularly, the displacement arm assembly 60 is pivotably coupled to the output shaft 64 of the gearbox assembly 56. The displacement arm assembly 60 is operable to vertically displace the rotatable support platform 20 with assistance of the vertical displacement assembly 18 or other displacement aid. It is noted, however, that in certain embodiments of the present invention, direct displacement of the rotatable support platform 20 (without the use of the vertical displacement assembly 18 or other displacement aid) is contemplated.

In the exemplary embodiment, the displacement arm assembly 60 broadly includes a crank arm 80, a support pin 82, and a support roller bearing 84. The displacement arm assembly 60 also includes mounting hardware for the support roller bearing 84, including, for example, a first washer 86, a second washer 88, and a fastener 92. A grease fitting 90 is coupled to the crank arm 80. In addition, a magnet 94 is also attached to the crank arm 80.

In the exemplary embodiment, the crank arm 80 has a pivot end 96 and a displacement end 98. As depicted in FIG. 2, the crank arm 80 is generally fixed to and extends radially from the output shaft 64 to rotate therewith. In particular, the pivot end 96 defines a splined aperture 100 that includes a plurality of axially-extending splines 102 extending at least partially through the splined aperture 100. The plurality of splines 102 are sized and shaped to engage a plurality of corresponding splines 76 defined on the output shaft 64 to rotatably fix the crank arm 80 to the output shaft 64 for rotation therewith. It is contemplated, however, that alternative means of interconnection are permissible, including for example, the use of keyed arrangements, fasteners, welds, adhesives, and the like.

The pivot end 96 of the crank arm 80 includes one or more threaded holes 104 defined therein. The threaded holes 104 extend generally radially inward to a central axis of the splined aperture 100. A fastener 105 (see FIG. 2) is received in each threaded hole 104 to secure the crank arm 80 to the output shaft 64, preventing movement in an axial direction. It is contemplated, however, that alternative means for securing the crank arm 80 to the output shaft 64 are permissible, including for example, friction fits, welds, adhesives, and the like.

The displacement end 98 of the crank arm 80 includes the magnet 94 secured thereto. In particular, the crank arm 80 includes a pocket 138 defined therein to receive the magnet 94. The pocket 138 is preferably machined into the crank arm 80 and locates the magnet 94 a predefined radial distance from a pivot point (such as, the rotation axis "A.") at the pivot end 96 of the crank arm 80. The magnet 94 is coupled to the crank arm 80, for example, using an adhesive, such as an epoxy resin or the like. Alternatively, the magnet 94 may be coupled to the crank arm 80 using any means that enables the magnet 94 to function as described herein. The crank arm position sensor assembly 136 discussed above is preferably a Hall device, although other sensor types may be used without departing from the scope of the present invention. The crank arm position sensor assembly 136 is configured to sense a desired position of the displacement arm assembly 60, for example, by sensing the proximity of the magnet 94.

The displacement end 98 of the crank arm 80 also includes a support pin aperture 106 defined therethrough. The support pin aperture 106 defines a central, longitudinal axis "B," which is substantially parallel to the rotation axis "A" when the crank arm 80 is coupled to the motor 21. Furthermore, the displacement end 98 includes a lubrication cavity 108, which includes a threaded bore 110 and a lubrication passage 112. The threaded bore 110 and the lubrication passage 112 are generally concentric, defining a longitudinal axis "C" that intersects the longitudinal axis "B," preferably at an angle of about ninety degrees (90°). Opposite the lubrication passage 108, the displacement end 98 further include a threaded counterbore 114 for receiving a fastener (not shown) therein to facilitate securing the support pin 82 in place, as described below. The threaded counterbore 114 is substantially concentric with the lubrication cavity 108, and as such, the longitudinal axis "C."

In the exemplary embodiment, the support pin 82 is coupled to the displacement end 98 and extends generally axially from the crank arm 80, such that the support pin 82 is substantially concentric with the longitudinal axis "B." More particularly, support pin 82 is coupled to the support pin aperture 106 via a friction fit, although in certain aspects of the present invention, other methods of coupling the support pin 82 to the crank arm 80 are contemplated. As used herein, the phrase "friction fit" means a value of tightness between two components, such as, an amount of clearance between the components. A negative amount of clearance is commonly referred to as a press fit, where the magnitude of interference determines whether the fit is a light friction fit or a friction fit. A small amount of positive clearance is referred to as a loose or sliding fit. The threaded counterbore 114 is configured to receive, for example, a high hold cone-point set screw or other fastener configured to secure the support pin 82 against axial movement.

The support pin 82 is substantially cylindrical in shape and includes two spaced apart annular grooves 116 and 118. The annular grooves 116 and 118 have a semi-circular cross-sectional shape, although other shapes are contemplated. Further, the annular grooves 116 and 118 are substantially continuous, extending circumferentially about the entirety of the support pin 82. The support pin 82 also includes a central bore 120 extending along a predefined length of the support pin 82. As depicted in FIGS. 7 and 8, the central bore 120 extends from a first end 126 of the support pin 82, past each of the annular grooves 116 and 118, and ends at a location spaced inwardly from a second end 128 of the support pin 82. A portion of the first end 126 of the central bore 120 is threaded to receive the fastener 92 therein.

Furthermore, the support pin 82 includes radial passages 122 and 124 extending between the annular grooves 116 and 118, respectively, and the central bore 120. Preferably, the radial passages 122 and 124 extend substantially through the support pin 82. It is contemplated, however, that the radial passages 122 and 124 may only extend inwardly to the central bore 120. In addition, while depicted with only single radial passages 122 and 124 extending through the support pin 82, in some embodiments, the support pin 82 may include two or more radial passages extending between the respective grooves 116 and 118, and the central bore 120.

The first washer 86 is positioned on the support pin 82 and against the crank arm 80 in face-to-face contact therewith. The support roller bearing 84 is then press fit onto the support pin 82. In particular, an inner race 130 of the support roller bearing 84 is pressed onto the support pin 82. The inner race 130 has one or more radially extending lubrication holes 132 defined therethrough. When pressed onto the support pin 82 and against the first washer 86 in face-to-face contact, the lubrication holes 132 substantially line up axially with the annular groove 118 of the support pin 82. The second washer 88 is positioned on the support pin 82 and in face-to-face contact with the inner race 130 of the support roller bearing 84. The fastener 92 is coupled to the threaded end of the central bore 120 to secure the first and second washers 86 and 88 and the support roller bearing 84 to the support pin 82. While described herein as a support roller bearing, it is contemplated that alternative bearing types may be used, including, for example, cylindrical roller bearings (single or multiple row), spherical roller bearings, needle bearings, and the like, although it remains important to provide a path (such as a hole through an inner race) to the interface to be lubricated.

In the exemplary embodiment, the grease fitting 90 is coupled to the threaded bore 110 of the lubrication cavity 108. The grease fitting 90 may be any type of grease fitting that enables the crank assembly 12 to function as described herein. For example, the grease fitting 90 may include a standard hydraulic (Type H) fitting, a flush fitting, a button head fitting, and the like. In the figures, the grease fitting is depicted as a Type H fitting.

A lubrication path, indicated by the arrows 78 in FIG. 8, is defined, in serial arrangement, by the grease fitting 90, the lubrication cavity 108 (via the lubrication passage 112), the annular groove 116, the radial passage 122, the central bore 120, the radial passage 124, the annular groove 118, and the lubrication holes 132. A lubricant may be channeled through the lubrication path 78 as described below. It is contemplated, however, that alternative lubrication path arrangements are within the ambit of certain aspects of the present invention. For example, the lubrication path may extend from another input (in addition to or other than the grease fitting 90 and/or lubrication cavity 108). Furthermore, the lubrication path may define a different path between the input and lubricated interface of the bearing (such as that defined between the illustrated races).

In the exemplary embodiment, a lubricant may be applied to the support roller bearing 84 by means of a lubricant application device (such as, a grease gun and the like). For example, lubricant application may be accomplished by use of a standard manual grease gun through the grease fitting 90 in the crank arm 80 by one or more pumps of the grease gun. The pressure exerted on the lubricant by the grease gun pushes the lubricant through the grease fitting 90 and along the lubrication path 78, filling any voids along the lubrication path. As the lubricant fills the path voids, it is pushed further along until being forced into the support roller bearing 84 via the lubrication holes 132. In this manner, the support roller bearing 84 may be lubricated at desired periods or intervals.

Advantageously, embodiments of the present invention provide for decreasing lubrication deficiencies of the support roller bearing 84, thus increasing a useful life of the support roller bearing 84. Providing a lubrication path configuration that allows radial insertion of a lubricant at a location axially spaced from the support roller bearing facilitates ease of lubrication of the bearing in confined spaces. Another advantage of the present invention is increased lubrication accuracy, extended equipment life, decreased maintenance costs, and reduced breakdown and repairs resulting in overall cost savings.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The invention claimed is:

1. A crank assembly for displacing a load, said crank assembly comprising:
   a motor including a rotatable output shaft defining a rotation axis; and
   a displacement arm assembly comprising:
      a swingable crank arm coupled to the output shaft to swing about the rotation axis when the output shaft rotates, the swingable crank arm defining a pivot end adjacent the rotation axis and an opposite displacement end; and
      a support roller bearing rotatably supported on the swingable crank arm proximate the displacement end, the support roller bearing being configured to engage the load, the support roller bearing defining a bearing axis, the bearing axis being substantially parallel to and offset from the rotation axis.

2. The crank assembly in accordance with claim 1,
   said pivot end including a splined aperture defined therethrough,
   said output shaft being splined and received in the splined aperture so that the swingable crank arm is rotatably fixed to the output shaft for rotation therewith.

3. The crank assembly in accordance with claim 1,
   said displacement arm assembly including one or more fasteners that restrict movement of the swingable crank arm in an axial direction relative to the output shaft.

4. The crank assembly in accordance with claim 1,
   said displacement end including a support pin aperture defined therethrough,
   said support pin aperture being concentric with the bearing axis.

5. The crank assembly in accordance with claim 4,
   said displacement arm assembly including a support pin, the support pin defining a first end and an opposite second end, the support pin being coupled to the support pin aperture at the second end,
   said support roller bearing being rotatably coupled to the first end of the support pin.

6. The crank assembly in accordance with claim 5,
   said displacement end including a lubrication cavity intersecting the support pin aperture,
   said support pin including a lubrication path defined therein, wherein the lubrication path is configured to channel a lubricant from the lubrication cavity to the support roller bearing.

7. The crank assembly in accordance with claim 6,
   said lubrication path including:
      a first annular groove defined in the first end of support pin,
      a central bore extending at least partially through the support pin,
      a first radial passage connecting the first annular groove to the central bore,
      a second annular groove defined in the second end of support pin, and
      a second radial passage connecting the second annular groove to the central bore.

8. The crank assembly in accordance with claim 7,
   said support roller bearing including an inner race and a radially outer race,
   said inner race including a lubrication hole,
   said lubrication hole being aligned with the first annular groove of the support pin.

9. The crank assembly in accordance with claim 8,
   said swingable crank arm including a grease fitting coupled to the displacement end of the swingable crank arm, the grease fitting being fluid communication with the lubrication cavity,
   said second annular groove of the support pin being aligned with the lubrication cavity.

10. The crank assembly in accordance with claim 7,
    at least a portion of said central bore being threaded at the first end of the support pin,
    said displacement arm assembly including a fastener coupled to the first end of the support pin, the fastener configured to secure the support roller bearing to the support pin.

11. The crank assembly in accordance with claim 5,
    said displacement arm assembly including one or more fasteners that restrict movement of the support pin in an axial direction relative to the swingable crank arm.

12. The crank assembly in accordance with claim 5,
    said support pin being coupled to the support pin aperture at the first end via a friction fit.

13. The crank assembly in accordance with claim 5,
    said support roller bearing being coupled to the second end of the support pin via a friction fit.

14. The crank assembly in accordance with claim 1,
    said displacement arm assembly including a magnet coupled to the swingable crank arm proximate the displacement end thereof.

15. The crank assembly in accordance with claim 14,
    said motor including a crank arm position sensor assembly configured to sense an angular position of the displacement arm assembly by sensing the magnet.

* * * * *